US009762310B2

(12) United States Patent
Ling

(10) Patent No.: US 9,762,310 B2
(45) Date of Patent: *Sep. 12, 2017

(54) METHOD AND SYSTEM FOR CACHING CONTENT FOR MOBILE DISTRIBUTION

(71) Applicant: Maxlinear, Inc., Carlsbad, CA (US)

(72) Inventor: Curtis Ling, Carlsbad, CA (US)

(73) Assignee: MAXLINEAR, INC., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/089,760

(22) Filed: Apr. 4, 2016

(65) Prior Publication Data

US 2016/0359550 A1  Dec. 8, 2016

Related U.S. Application Data

(63) Continuation of application No. 13/591,826, filed on Aug. 22, 2012, now Pat. No. 9,306,684.

(51) Int. Cl.
*H04H 60/00* (2009.01)
*H04B 7/185* (2006.01)
(Continued)

(52) U.S. Cl.
CPC ........ *H04B 7/18515* (2013.01); *H04H 20/08* (2013.01); *H04H 40/90* (2013.01); *H04H 60/14* (2013.01); *H04H 60/21* (2013.01); *H04H 60/27* (2013.01); *H04H 60/53* (2013.01); *H04H 60/92* (2013.01); *H04L 65/60* (2013.01); *H04L 67/18* (2013.01); *H04L 67/2842* (2013.01); *H04W 4/02* (2013.01); *H04L 67/02* (2013.01); *H04L 67/42* (2013.01); *H04N 7/20* (2013.01);
(Continued)

(58) Field of Classification Search
CPC .............................. H04W 72/12; H04W 48/04
USPC .................................... 455/3.02, 452.1, 3.06
See application file for complete search history.

(56) References Cited

U.S. PATENT DOCUMENTS

2002/0154055 A1  10/2002  Davis et al.
2003/0203717 A1  10/2003  Chuprun et al.
(Continued)

FOREIGN PATENT DOCUMENTS

| EP | 1494353 A3 | 1/2006 |
|---|---|---|
| WO | 2009143082 A1 | 11/2009 |
| WO | 2011033342 A1 | 3/2011 |

OTHER PUBLICATIONS

European Search Report for EP 12003194 dated Aug. 24, 2012.

*Primary Examiner* — Tu X Nguyen
(74) *Attorney, Agent, or Firm* — McAndrews, Held & Malloy, Ltd.

(57) ABSTRACT

Method and system are provided for mobile distribution of content received via satellite signals. A satellite reception assembly may comprise a receive module and a basestation module. The receive module may receive satellite signals, process the received satellite signals to recover data carried therein, determine when the recovered data comprises a portion for local wireless broadcast by the system, and if so generate broadcast signals for carrying the portion of recovered data. The basestation module may transmit the generated broadcast signals, particularly to a mobile device of a satellite subscriber authorized to receive and access the data carried in the satellite signals. The recovered data may comprise web-based content.

17 Claims, 9 Drawing Sheets

(51) Int. Cl.
*H04H 40/90* (2008.01)
*H04H 60/27* (2008.01)
*H04H 20/08* (2008.01)
*H04H 60/14* (2008.01)
*H04H 60/21* (2008.01)
*H04H 60/53* (2008.01)
*H04H 60/92* (2008.01)
*H04L 29/06* (2006.01)
*H04W 4/02* (2009.01)
*H04W 84/06* (2009.01)
*H04N 7/20* (2006.01)
*H04L 29/08* (2006.01)
*H04W 88/02* (2009.01)
*H04W 88/10* (2009.01)

(52) U.S. Cl.
CPC ............ *H04W 84/06* (2013.01); *H04W 88/02* (2013.01); *H04W 88/10* (2013.01)

(56) References Cited

U.S. PATENT DOCUMENTS

| | | |
|---|---|---|
| 2006/0262222 A1 | 11/2006 | Monnier et al. |
| 2008/0060024 A1 | 3/2008 | Decanne |
| 2008/0268838 A1* | 10/2008 | Zufall ................ H04B 7/18536 455/430 |
| 2009/0007189 A1 | 1/2009 | Gutknecht et al. |
| 2009/0085803 A1 | 4/2009 | Mergen |
| 2009/0113492 A1 | 4/2009 | Norin et al. |
| 2009/0210148 A1 | 8/2009 | Jayanthi |
| 2011/0312320 A1 | 12/2011 | Moeglein |
| 2013/0244711 A1 | 9/2013 | Burckart et al. |

* cited by examiner

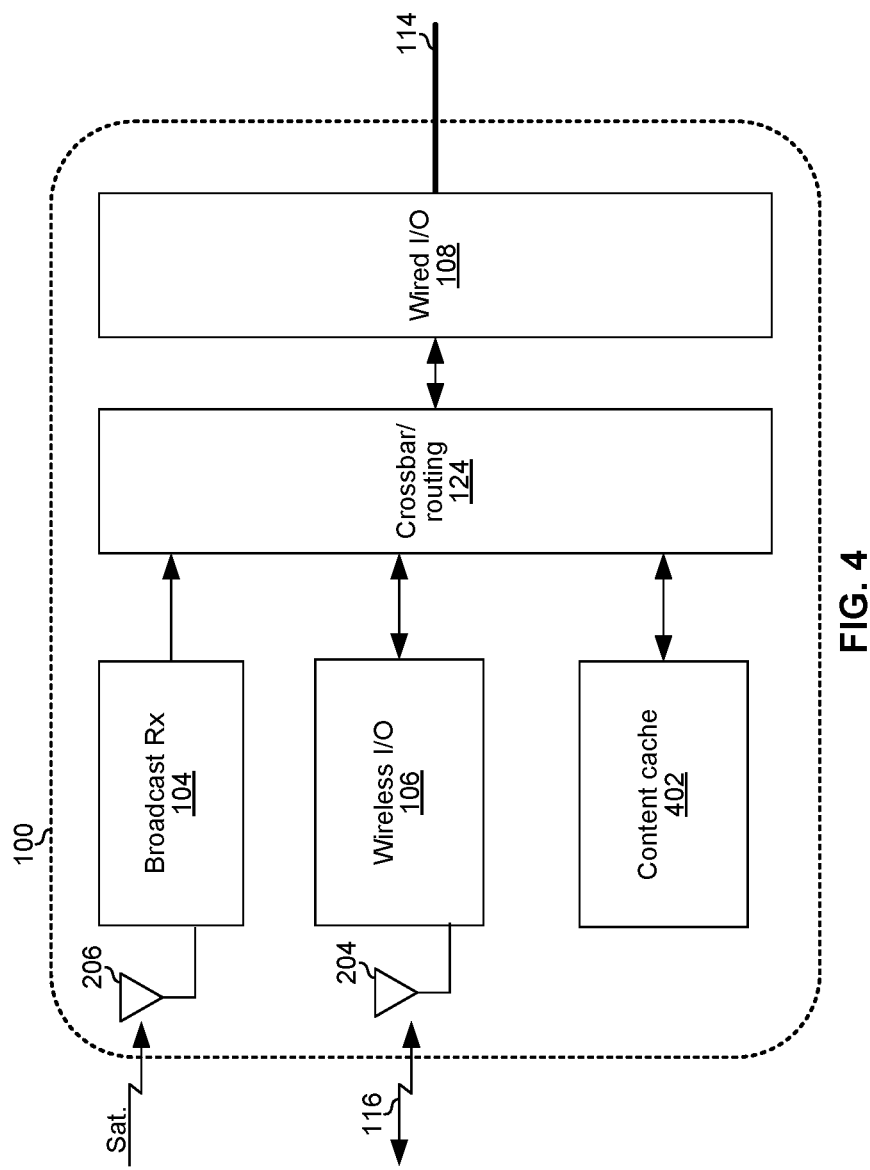

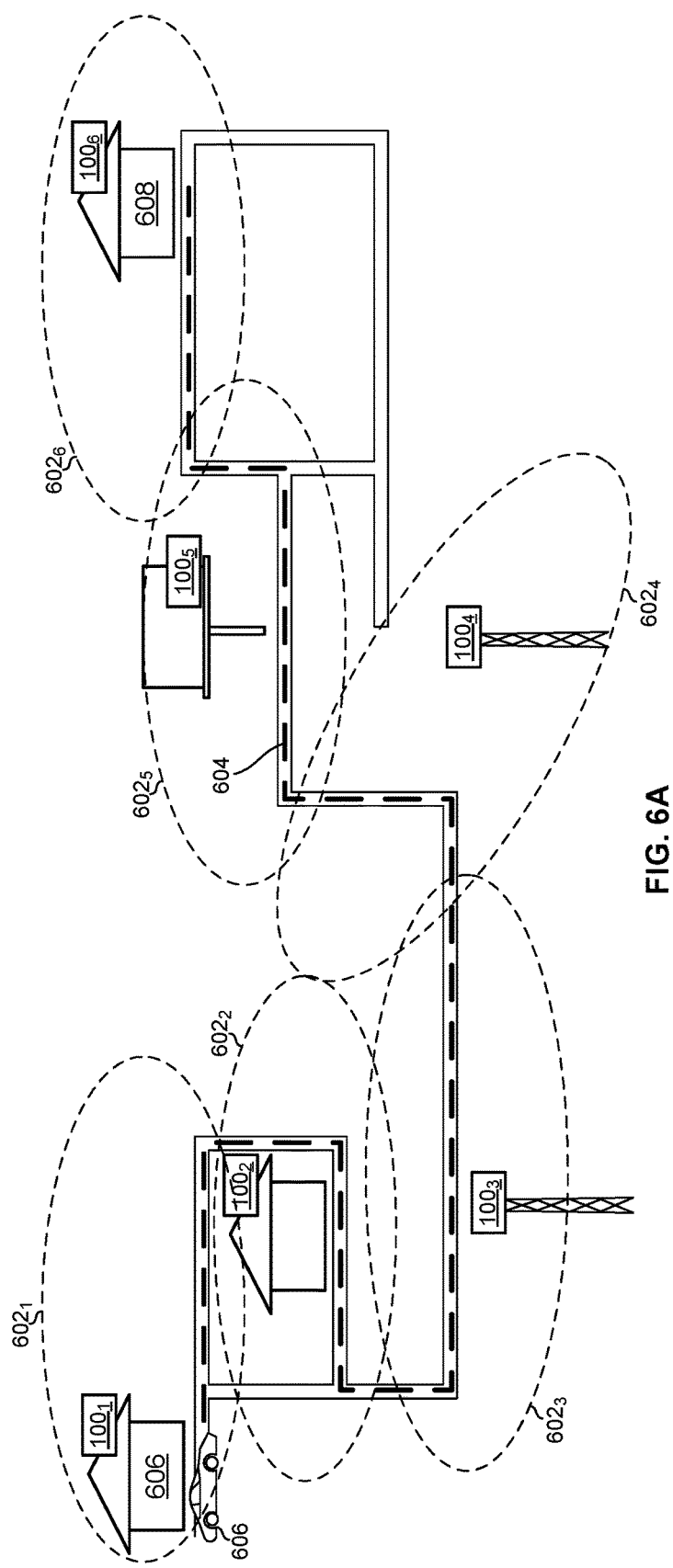

METHOD AND SYSTEM FOR CACHING CONTENT FOR MOBILE DISTRIBUTION

CLAIM OF PRIORITY

This application is a continuation of U.S. Ser. No. 13/591,826, filed Aug. 22, 2012 (now U.S. Pat. No. 9,306,684).

INCORPORATION BY REFERENCE

This patent application makes reference to:
U.S. Pat. No. 8,700,449 entitled "Targeted Advertisement in the Digital Television Environment;"
U.S. Pat. No. 9,124,925 entitled "System and Method for Conditional Access in an In-Home Network Based on Multi-Network Communication;"
U.S. Pat. No. 9,055,329 entitled "System and Method in a Broadband Receiver for Efficiently Receiving and Processing Signals;"
U.S. Pat. No. 8,466,850 entitled "Method and System for Multi-Service Reception;"
U.S. Pat. No. 8,929,278 entitled "Method and Apparatus for Content Protection and Billing for Mobile Delivery of Satellite Content;" and
U.S. Pat. No. 9,008,571 entitled "Method and System for A Single Frequency Network for Broadcasting to Mobile Devices".

Each of the above applications is hereby incorporated herein by reference in its entirety.

TECHNICAL FIELD

Aspects of the present application relate to electronic communications. More specifically, to a method and system for caching content for mobile distribution.

BACKGROUND

Conventional methods and system for delivering content to mobile devices can be inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A method and/or apparatus is provided for caching content for mobile distribution, substantially as illustrated by and/or described in connection with at least one of the figures, as set forth more completely in the claims.

BRIEF DESCRIPTION OF THE DRAWINGS

FIG. 4 depicts an example system for caching and delivering data.

FIG. 6A illustrates caching of content based on provided route information and/or location prediction.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "block" and "module" refer to functions than can be performed by one or more circuits. As utilized herein, the term "exemplary" means serving as a non-limiting example, instance, or illustration. As utilized herein, the term "e.g.," introduces a list of one or more non-limiting examples, instances, or illustrations.

Figure 1A:
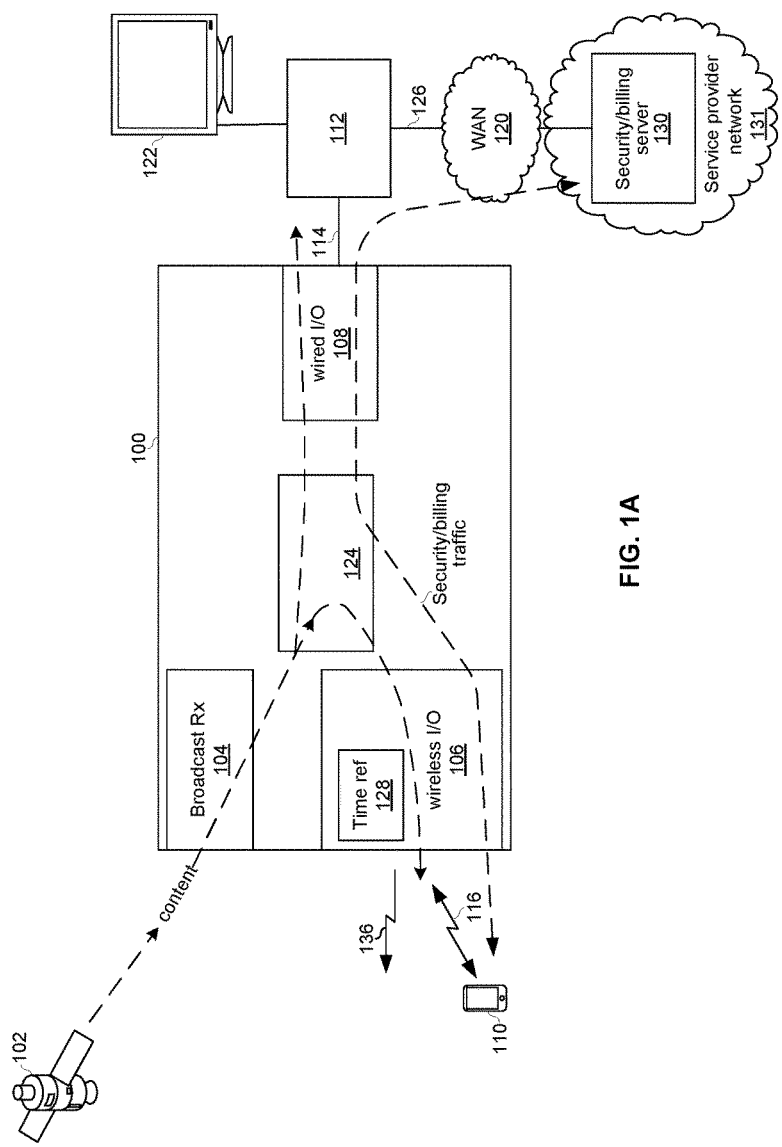
FIGS. 1A and 1B depict a system that is operable to broadcast data to mobile devices.
Figure 1B:
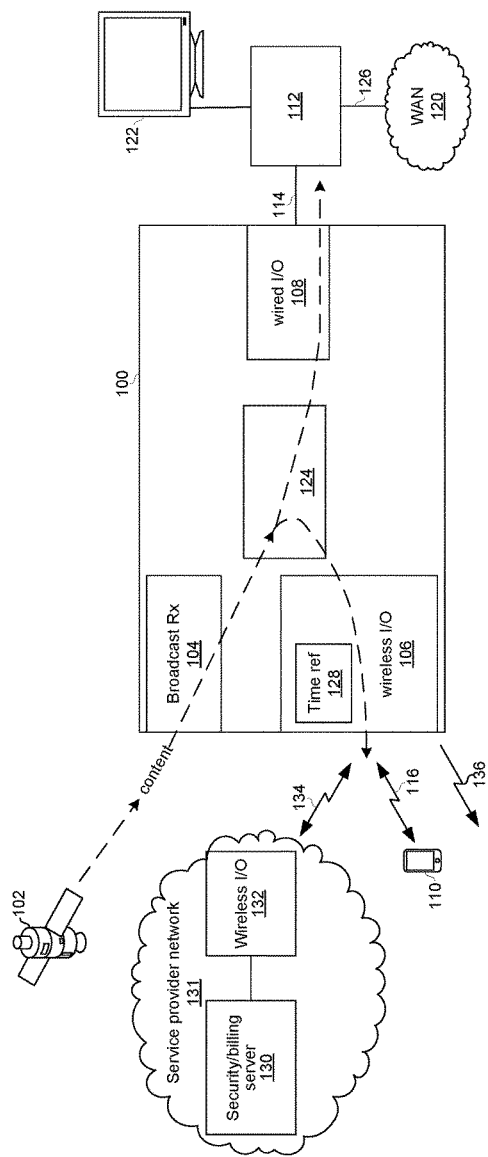

FIGS. 1A and 1B depict a system that is operable to broadcast data to mobile devices. Referring to FIG. 1A, the system 100 comprises a broadcast receive module 104, a wireless input/output (I/O) module 106, a wired I/O module 108, and a routing module 124. Also shown are a service provider network 131, a mobile device 110, a module 112, a client device 122, and a wide area network (WAN) 120.

The satellite 102 may broadcast data (e.g., media content) in accordance with a broadcast standard such as, for example, DVB-S. In an example implementation, some of the bandwidth of the satellite 102 may be utilized for transmitting mobile-formatted content. For example, the content of one or more television networks may be concurrently broadcast in a first format (e.g., high-definition, low-compression ratio video and surround-sound audio) a second format (e.g., standard definition, high-compression ration video and stereo audio). The first format may be encrypted and/or scrambled utilizing a first content protection scheme (e.g., a first set of security algorithms and/or a first set of keys and/or certificates) and the second format may be encrypted and/or scrambled utilizing a second content protection scheme (e.g., a first set of security algorithms and/or a first set of keys and/or certificates). For example, content protected with the first scheme may be recoverable only by devices (e.g., gateways) that have built-in hardware-based conditional access systems (CAS), whereas content protected with the second scheme may be recoverable utilizing keys obtained through two-way exchanges.

The network 131 represents the network(s) of one or more service providers. For example, the network 131 may comprise a network of a cellular service provider, a network of a satellite service provider, and/or a network of a billing service provider that performs billing functions for other service providers. The security and/or billing server 130 may manage billing accounts for subscribers of one or more service providers. For example, the server 130 may maintain a database of users and/or mobile devices which are subscribed to content that is broadcast by the satellite 102 and delivered in a unicast and/or multicast manner via the WAN 120, and may track consumption of the content by those users/devices. This information may be provided to a satellite service provider so that the satellite provider can bill the users/devices for the content. Similarly, the server 130 may maintain a database of users and/or mobile devices which are subscribed to wireless (e.g., cellular) services associated with the wireless module 106 and may track usage of the module 106's bandwidth. This information may be provided to a cellular service provider so that the cellular provider can bill the users/devices for the bandwidth usage.

Additionally or alternatively, the security and/or billing server 130 may manage certificates, keys, and/or other security information for accessing content broadcast by the satellite 102 and/or delivered to the system 100 via the WAN 120 and broadband connection 126. For example, the server 130 may maintain a database of content currently being transmitted to the system 100 and keys and/or other security information associated with that content. In the example implementation shown in FIG. 1A, the system 100 communicates with the server 130 via the WAN 120. In the implementation shown in FIG. 1B, on the other hand, the server 130 is reachable wirelessly, via wireless I/O module 132, such that the system 100 can communicate with the server 130 via a connection 134 without use of the WAN 120 or broadband connection 126.

The mobile device 110 may be operable to communicate wirelessly in accordance with one or more wireless communication protocols. For example, the device 110 may be a cellular handset operable to communicate in accordance with cellular (e.g., LTE), WiMAX, WiGig, and/or IEEE 802.11 protocols.

Figure 2:
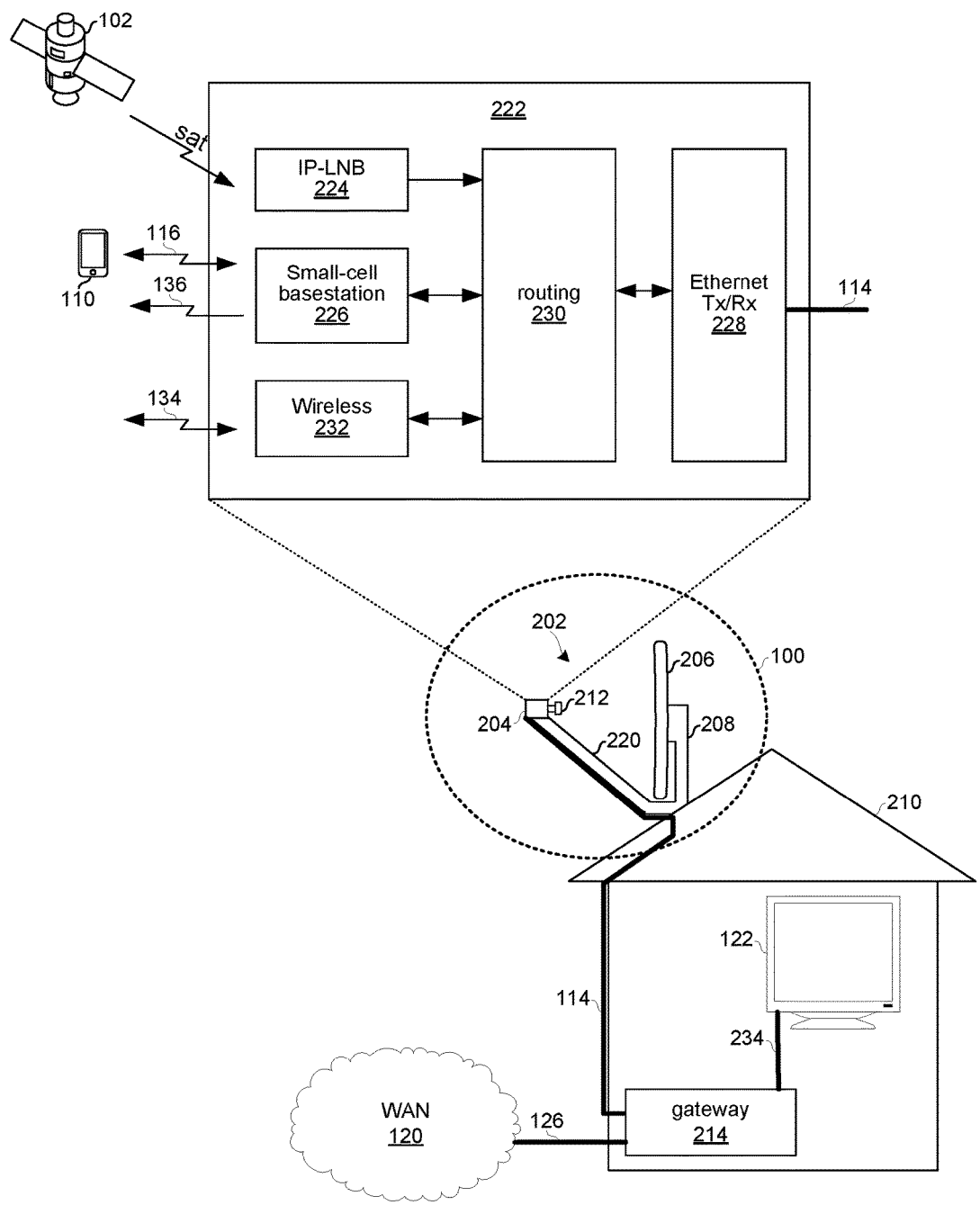
FIG. 2 depicts an example implementation of the system of FIG. 1 in which the system comprises a small-cell base station.
Figure 3:
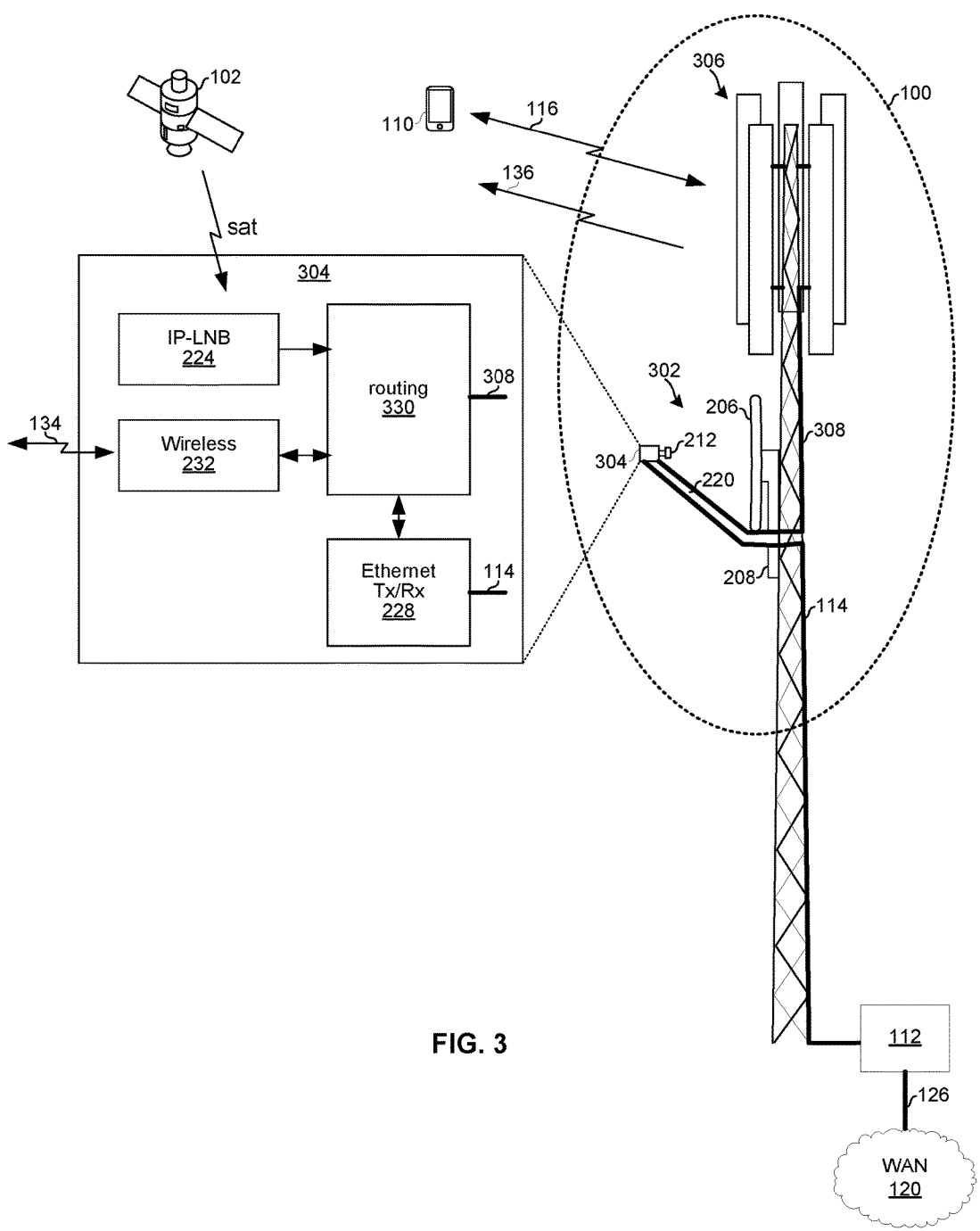
FIG. 3 depicts an example implementation of the system of FIG. 1 in which the system comprises a macrocell basestation.

The various components of the system 100 and the module 112 may be collocated on, for example, a cellular tower as shown in FIG. 3, on a satellite subscriber premises (e.g., a house, multi-dwelling unit, or business) as shown in FIG. 2, and/or in any other suitable location (e.g., a roadside billboard). The system 100 may comprise one or more printed circuit boards and/or one or more integrated circuits (e.g., one or more silicon die).

The system 100 and the module 112 may be part of a local area network (LAN) and may be interconnected via a LAN technology such as Ethernet (e.g., Ethernet frames communicated over an Ethernet physical layer such as 10/100/1G/10G/40GBASE-T). In an example implementation, each port of the system 100 and the port of module 112 that connects to system 100 may share a common subnet address that is not shared with the port of the module 112 that connects to the WAN 120. The module 112 may interface the LAN to a wide area network (WAN) 120 over broadband connection 126 utilizing, for example, DOCSIS, DSL, Carrier Ethernet, ATM, Frame Relay, ISDN, x.25, and/or other suitable WAN technology. The WAN 120 may, for example, backhaul traffic between wireless I/O module 106 and a cellular core network.

The broadcast (e.g., satellite broadcast) receive module 104 may be operable to receive broadcast signals and process the received broadcast signals to recover data (e.g., audio content, video content, and/or auxiliary data related to audio and/or video content) carried therein. Although this disclosure focuses on satellite radio and satellite television broadcast signals, the present invention is not so limited. Rather, other types of signals such as terrestrial broadcast television signals are contemplated. Accordingly, various implementations of the system 100 may comprise features described in U.S. patent application Ser. No. 13/546,704, which is incorporated herein by reference, as set forth above. In an example implementation, the receive module 104 may perform channelization such that specific channels, streams, programs, etc. from the receive module 104 can be selectively conveyed to the routing module 124. In an example implementation, the receive module 104 may output data in the form of MPEG transport stream(s) to the routing module 124. In an example implementation, the receive module 104 may encapsulate received data utilizing one or more protocols (e.g., Internet Protocol) for output to the routing module 124.

The wireless module 106 may be operable to engage in unicast and/or multicast communications with user equipment as represented by the connection 116. The wireless module 106 may be operable to engage in unicast and/or multicast communications with a service provider, as represented by connection 134. The wireless module 106 may be operable to broadcast data (e.g., media content), as represented by signal 136. The wireless module 106 may transmit and/or receive utilizing one or more wireless communication protocols such as, for example, cellular (e.g., LTE), WiMAX, WiGig, and/or IEEE 802.11 protocols. In various example implementations, the wireless module 106 may transmit and/or receive utilizing frequency spectrum owned and/or licensed by a cellular provider, utilizing unlicensed frequency spectrum (e.g., in an Industrial, Scientific, and Medical (ISM) band) and/or utilizing dedicated frequency spectrum owned and/or licensed by the satellite provider affiliated with the satellite 102. In an example implementation, data may be communicated between the wireless module 106 and the routing module 124 in the form of MPEG transport stream (TS) packets. In an example implementation, data may be communicated between the wireless module 106 and the routing module 124 in the form of Internet Protocol (IP) packets.

In an example implementation, the wireless module 106 may comprise a timing reference module 128 which may enable the wireless module 106 to synchronize timing of its transmissions to a reference clock and/or frequency of its transmissions to a frequency reference signal. For example, the timing reference module 128 may be operable to synchronize to a reference clock and/or frequency reference signal present in received global navigation satellite system (GNSS) signals.

The wired module 108 may be operable to communicate data, via one or more cables 114, with module 112. The module 112 (e.g., a media gateway and/or edge router) may, in turn, route traffic between the system 100 and one or more other devices (e.g., client devices, such as client 122, connected to the gateway and/or interior network nodes connected to the gateway). In an example implementation, the wired I/O module 108 may be operable to output, onto the cable(s) 114, L-band signals received from the receive module 104. Such signals may be output in instances that the module 112 is a legacy gateway. Additionally or alternatively, the wired module 108 may be operable to communicate over the cable(s) 114 utilizing Ethernet, Multimedia over Coax Alliance (MoCA), and/or any other suitable protocol(s). In this manner, content may be delivered to the system 100 via the WAN 120 and broadband connection 126. Such communications may be used, for example, when the module 112 is a gateway that is compatible with an IP-LNB as described in U.S. patent application Ser. No. 13/326,125, which is incorporated by reference herein as set forth above.

In another example implementation, the module 112 may support a wireless connection and the functionality of the wired module 108 may be subsumed by the wireless module 106 and/or by a second wireless module.

The routing module 124 may be operable to selectively route data and/or signals between the modules 104, 106, and 108. The routing may be based, for example, on IP addresses, TCP/UDP port numbers, packet identifiers (PIDs), stream identifiers, and/or any other suitable field or information. For example, packets comprising a first PID (e.g., packets carrying mobile-formatted content) may be sent to the wireless module 106 and packets comprising a second PID (e.g., packets carrying high-definition content) may be sent to the wired module 108. In an example implementation, the routing module 124 may be a digital and/or analog crossbar. In an example implementation, the routing module 124 may perform an OSI layer-3 packet-routing function and/or an OSI layer-2 packet-switching function. The routing module 124 may be configured via one or more control signals (not shown) which may, in turn, be based on input (e.g., utilizing a protocol such as DiSEqC) from the module 112 and/or client devices such as the client device 122 and client device 110.

In operation of an example implementation, the broadcast receive module 104 may receive a satellite signal and perform block down conversion to generate an L-band signal. The L-band signal may be conveyed to the wired module 108 for support of legacy gateways. The receive module 104 may also demodulate the L-band signal to recover one or more MPEG transport streams, channelize the transport stream(s) to recover one or more programs, and encapsulate the transport stream(s) and/or program(s) into one or more packet streams (e.g., utilizing IP or some other suitable protocol(s)). In some instances, the receive module 104 may be operable to decrypt, encrypt, descramble, and/or scramble recovered transport stream(s)/program(s) as described in U.S. patent application Ser. No. 13/316,796, which is incorporated by reference herein as set forth above. The one or more packet streams may be conveyed, via routing module 124, to the wireless module 106 and/or the wired module 108.

The wired module 108 may decapsulate, encode, modulate, encrypt, and/or otherwise process the transport stream(s) to generate signals suitable for transmission via the cable(s) 114. The wired module 108 may transmit the generated signals via the cable(s) 114. Additionally, the wired module 108 may receive signals via the cable(s) 114, decapsulate, encode, modulate, encrypt, and/or otherwise process the signals to recover content carried in the signals that may have originated from the module 112 and/or been received via the WAN 120 and the broadband connection 126. The wired module 108 may encapsulate the content into a packet stream and convey the packet stream to the routing module 124.

The wireless module 106 may encode, modulate, and/or otherwise process packet stream(s) received from the routing module 124 to generate signals suitable for broadcast by the basestation 226. Thus, the system 100 may enable broadcast of satellite data and/or data delivered to the system 100 via the WAN 120 and broadband connection 126. For the data received from the satellite 120, the system 100 may enable delivering the data to the mobile device 110 without the data having to traverse the WAN 120 or the broadband connection 126. The wireless module 106 may also convey information about the mobile device 110, and information about the data consumed by the mobile device 110, to the server 130 for purposes of billing and/or usage tracking.

Broadcasts of data by the wireless module 106 may be synchronized via, the timing reference module 128, to a received reference clock and/or frequency reference signal. In this manner, the wireless module I/O 106 may be operable to broadcast particular data at the same time and on the same frequency band that the same data is being broadcast by other transmitters (e.g., other instances of the system 100).

The system 100 along with the other transmitters may thus form a single-frequency broadcast network (SFN). As utilized herein, "single frequency" network refers to the fact that particular data may be simultaneously (or nearly so) transmitted by multiple transmitters on the same frequency. Each transmitter, however, is not limited to broadcasting on only a single frequency. Rather, each transmitter may broadcast data on multiple frequencies. Each transmitter that is part of the SFN may adhere to an electronic programming guide (EPG) that is distributed, for example, via the satellite 102 and/or the server 130. The EPG may establish which data should be broadcast on which frequency band. In an example implementation, the EPG may assign content and frequency bands on a region-by-region basis such that transmitters in a particular region each broadcast the same data on the same frequency. In this manner, to a device 110 roaming around a particular geographic region, the signals from the various transmitters in the region may simply appear, and be processed, as if they are multipath signals from a single transmitter. Different frequency bands may be utilized in different regions to, for example, account for different spectrum availability in the different regions.

FIG. 2 depicts an example implementation of the system of FIG. 1 in which the system comprises a basestation, such as, for example, a small-cell (e.g., femtocell or picocell) base station. In FIG. 2, the system 100 comprises a satellite reception assembly 202, and a gateway 214. The subassembly 204 comprises a feed horn 212, an IP-LNB module 224, a cellular basestation module 226, a routing module 230, an Ethernet transceiver module 228, and a wireless transceiver 232. The various modules of the subassembly 204 may reside in one or more housings, on one or more printed circuit boards, and/or on one or more integrated circuits (e.g., one or more silicon dice). The satellite reception assembly is not, however, limited to implementations comprising a dish. For example, another implementation of the satellite reception assembly 204 may comprise a linear or parabolic array of antenna elements and/or receiver circuits whose signals may be combined for satellite signal reception.

In the example implementation depicted, the satellite reception assembly 202 comprises a parabolic reflector 206 and a subassembly 204 mounted (e.g., bolted or welded) to a support structure 208 which, in turn, comprises a boom 220 and attaches (e.g., via bolts) to the premises 210 (e.g., to the roof). In another example implementation, all or a portion of the modules 224, 226, 228, 230, and 232 may be mounted to the premises separate from the satellite dish and feed horn (e.g., connected via wired and/or wireless connections), but may still be part of the "outdoor unit." In another example implementation, all or a portion of the modules 224, 226, 228, 230, and 232 may be part of the gateway 214 (or "indoor unit").

The IP-LNB module 224 may be an implementation of the receive module 104 described above and may be as described in U.S. patent application Ser. No. 13/326,125, which is incorporated herein by reference, as set forth above. The nomenclature "IP-LNB" indicates that the module 224 possesses capabilities beyond the block downconversion of received satellite signals that is performed by conventional LNBs. Functions performed by the IP-LNB module 224 may comprise, for example, downconverting received satellite signals, demodulating received satellite signals, channelizing received satellite signals, and/or encapsulating data recovered from received satellite signals into IP packets.

The routing module 230 may be an implementation of the routing module 124 described above. Functions performed by the routing module 230 may comprise routing of data between the IP-LNB module 224, the cellular basestation module 226, and the Ethernet transceiver module 228. Although an implementation in which the routing module supports IP-based routing is described herein, any suitable protocols (e.g., Ethernet, PCIe, USB, etc.) can be utilized for communication of data between modules 224, 226, 228, 230, and 232.

The Ethernet transceiver module 228 may be an implementation of the wired module 108 described above. Functions performed by the module 228 may comprise encapsulation of data from the routing module 230 into Ethernet frames and transmission of the Ethernet frames onto the cable(s) 114 in accordance with Ethernet protocols. Additionally or alternatively, functions performed by the module 228 may comprise reception of Ethernet frames via the cable(s) 114, processing of the Ethernet frames to recover data carried therein (e.g., IP packets), and conveyance of the recovered data to the routing module 230.

The combination of the small-cell basestation module 226 and the wireless module 232 may be an implementation of the wireless module 106 described above. Functions performed by the basestation module 226 may comprise communication with cellular-enabled user-equipment (e.g., handsets, tablets, and/or laptops) that are within communication range of the basestation 226. The basestation module 226 may be operable to receive data via one or more cellular connections 116, process the received data, and output the data to the routing module 230 in the form of one or more IP packets. Similarly, the small-cell basestation 226 may be operable to receive IP packets from the routing module 230, process the IP packets, and transmit signals carrying the IP packets (or their contents) via one or more connections 116.

Functions performed by the wireless module 232 may comprise accessing the security and/or billing server 130 via the wireless connection 134 between the wireless module 106 of the system 100 and the wireless module 132 which provides wireless connectivity to the server 130. The amount of bandwidth needed for communicating billing and/or security information over the connections 116 and 134 may be small relative to the amount of bandwidth needed for the broadcast signals 136. Accordingly, in an example implementation, the module 226 may utilize, for example, $4^{th}$ generation protocols such as LTE whereas the wireless module 232 may utilize, for example, 2.5 or $3^{rd}$ generation protocols such as EDGE, HSPA, or EVDO.

The gateway 214 may be an implementation of module 112 described above. Functions performed by the gateway 214 may comprise reception, processing, and transmission of data. The gateway 214 may transmit and/or receive data to and/or from the system 100 (via cable(s) 114), the WAN 120 (via WAN connection 126), and/or one or more client devices 122 (via one or more connections 234). For data from the module 228 to a client device 122, the gateway 214 may recover the data from Ethernet frames received over the cable(s) 114 and output the data to the client device 122. For data from the client device 122 and/or gateway 114 to the module 228, the gateway 214 may encapsulate the data in one or more Ethernet frames and output the frames onto the cable(s) 114. For data between the WAN 120 and the module 228, the gateway 214 may perform OSI layer-2 switching and/or OSI layer-3 routing. Although the implementation shown in FIG. 2 uses wired connections between the gateway 214 and module 228, and between the gateway 214 and WAN 120, other may utilize wireless connections. Although the gateway 214 is depicted as separate from the system 100, in other implementations at least a portion of the system 100 may reside in and/or be implemented by the gateway 214.

In operation, the IP-LNB module 224 may process received satellite signals to recover content carried on one or more satellite channels. In an example implementation, content on one or more of the channels may be formatted for consumption by mobile devices. The content may be cached locally (as described below with reference to FIGS. 4-6B) and conveyed to the routing module 230. Additionally or alternatively, mobile-formatted content received from the gateway 214 (such content may have, for example, originated in a digital video recorder of the gateway 214 and/or been received via the WAN 120) may be conveyed to the routing module 230 via the Ethernet transceiver 228. The routing module 230 may convey the mobile-formatted content to the small-cell basestation module 226.

The system 100 may allocate the content among frequencies that are available for transmitting the content. For example, where the content comprises a plurality of television networks, each network may be broadcast on a different frequency according to an EPG provided to the system 100 (e.g., by the satellite 102 and/or by the server 103). Similarly, where the content comprises a plurality of programs, each program may be broadcast on a different frequency according to an EPG provided to the system 100.

The mobile device 110 within the coverage area of the basestation module 226 may request satellite content (e.g., a particular TV network or program) via the connection 116. In response to the request for content, the system 100 may communicate with the server 130 to provide information to the server 130 such that the server can determine whether the mobile device 110 is authorized to receive the requested content, and to provide information to the server 130 so that that an account associated with the mobile device 110 can be billed for the requested content and/or for the bandwidth utilized in receiving the content. The system 100 may communicate with the server 130 via the connection 134. Additionally or alternatively, the system 100 may communicate with the server 130 via the module 228, cable 114, gateway 214, and WAN 120.

Upon the server 130 determining that the mobile device 110 is authorized to receive the content that it is requesting, decryption/descrambling keys, an EPG, and/or other information necessary for receiving the requested content may be transmitted to the device 110 via connections 134 and 116. The mobile device 110 may then tune to the frequency of the desired content, receive the broadcast content, descramble and/or decrypt the received content, and present the content to its user.

In this manner, for satellite content received via the IP-LNB 224, such satellite content may be delivered to the mobile device 110 without the content having to traverse the WAN 120 or the connection 126. Thus, in instances that the system 100 communicates with the server 130 via connection 126 and WAN 120, satellite content may be delivered to the mobile device 110 while only adding a small amount of billing and/or security traffic to the WAN 120. Moreover, in instances that the system 100 communicates with the server 130 via connection 134, satellite content may be delivered to mobile device 110 without putting any load on the connection 126 or WAN 120, thus enabling delivery of the satellite content even when the broadband connection 126 and/or WAN 120 are unavailable.

In an example implementation, the mobile device 110 may belong to a first satellite subscriber and the satellite reception assembly 302 may be installed at the home of a second satellite subscriber. Thus, aspects of the present disclosure may enable the first subscriber to receive satellite content to which he has subscribed via another subscriber's satellite reception assembly.

FIG. 4 depicts an example system for caching and delivering data. In the example implementation of the system 100 shown in FIG. 4, the system 100 comprises the modules 104, 106, 124, and 108 described above. The implementation of system 100 in FIG. 4 also comprises a data caching module 402.

The data caching module 402 may, for example, comprise memory (e.g., magnetic and/or solid state memory) suitable for storing media content, website content, and/or other data. In an example implementations, the caching module 402 may reside in a next-generation LNB assembly, such as assembly 204 (FIG. 2) or 304 (FIG. 3). In an example implementation, the caching module 402 may be housed separately but collocated with a satellite reception assembly such as assembly 202 or 302 (e.g., mounted in or to the same house, business, or cell tower and connected to the satellite reception assembly via a wired or wireless connection).

In various example implementations, all or a portion of the system 100 may be mounted to the premises separate from the satellite dish and feed horn (e.g., connected via wired and/or wireless connections), but may still be part of the "outdoor unit." In another example implementation, all or a portion of the modules 224, 226, 228, 230, and 232 may be part of the gateway 214 (or "indoor unit").

In operation, media data received via one or more of the modules 104, 106, and 108 may be stored in the cache module 402 for later transmission via one or both of the modules 106 and 108. Which data is cached may be determined based on, for example, past, current, and/or expected demand for particular data in particular areas; characteristics of devices (and/or subscribers associated therewith) that are, were, and/or will be connected to the wireless module 106 and/or to the wired module 108; and/or past, current, and/or an expected number of devices that are, or will be, connected to the module 106 and/or the module 108.

Data cached on systems 100 may comprise data delivered via satellite (e.g., satellite 102) and/or data delivered via the WAN 120 (e.g., the Internet). Data that is cached in particular instances of system 100 may be, for example, based on which content is available in local spot beam incident on the particular instance of system 100, based on which providers have reached an agreement with an operator of the particular instance of system 100, based on popularity of particular content in the area served by the particular instance of system 100, and/or based on any algorithm that attempts to cache content in locations where doing so will improve network efficiencies and/or increase revenues for content providers and/or service providers. Instances of the system 100 may cache: individual movies, catalogs of movies, single episodes of shows, entire seasons of shows, individual audio tracks, entire albums, or any combination thereof. Cached content may be broadcast and/or delivered on-demand in multicast and/or unicast format.

In an example implementation, web-based content which otherwise may only be available to the system 100 via the WAN 120 may be transmitted by the satellite 102. For example, web-based content that is popular in a particular area may be beamed up to the satellite 102 and then transmitted down to instances of the system 100 via one or more local spot beams. The use of the local spot beams may enable rapid caching of the content on the instances of the system 100 without loading down the WAN 120. Moreover, where the system 100 is operable to capture an entire satellite band (e.g., a band of ~1 GHz), large amounts of content may be cached to the system 100 in a very short amount of time such that the reallocation of the spot beam(s) to transmitting web-based content only takes a very short amount of time and/or occurs infrequently (e.g., at off-peak times when one or more local television networks is off air).

Various example caching scenarios are described below with respect to FIGS. 5A-5C.

Figure 5A:
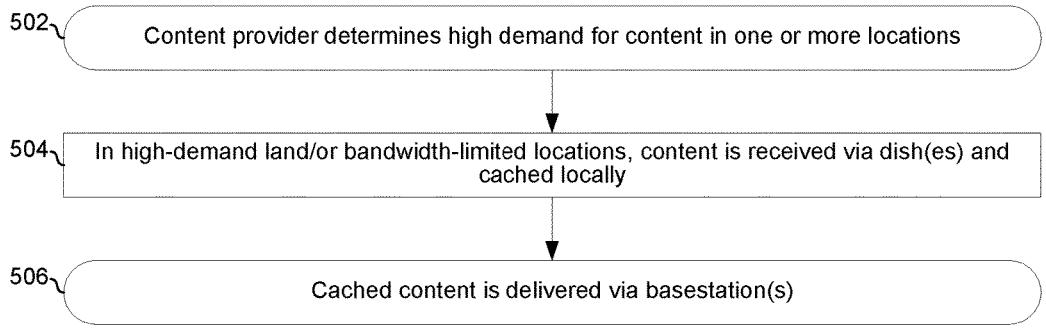
FIGS. 5A-5C are flowcharts illustrating exemplary steps for caching and delivering data.

The example steps in FIG. 5A begin with step 502 in which a content provider (e.g., a satellite provider) determines that there is, or will be, high demand for particular content in a coverage area served by the system 100. In step 504, the system 100 in the high-demand location receives and stores the high-demand content in its cache module 402. In step 506, mobile devices within the coverage area of the system 100 that request the high-demand content are delivered the cached content via the module 106 rather than via the WAN 120.

Figure 5B:
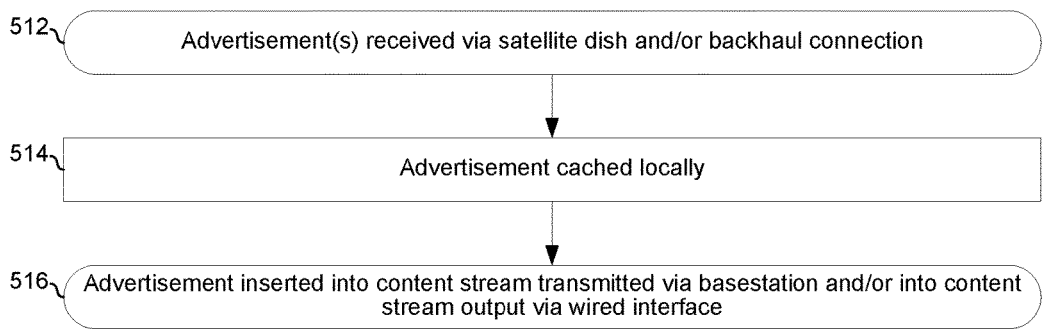

The example steps in FIG. 5B begin with step 512 in which advertising content is received by the system 100 via its module 106 and/or its module 108. In step 514, the advertising content may be stored in the cache 402 of the system 100. In step 516, the system 100 may insert the cached advertisement into one or more media streams being transmitted via the module 106 and/or via the module 108. Different ads may be sent via the module 106 than the module 108. Similarly, different ads may be sent in media streams going to different mobile devices. Which advertisements are cached in the system 100 and/or which advertisements are inserted into which media streams and/or delivered to which devices may be, for example, determined based on negotiations between content providers and the provider who owns and/or operates the system 100, and/or based on targeted advertising methods such as is disclosed in U.S. patent application Ser. No. 11/928,203, which is incorporated herein by reference, as set forth above.

Figure 5C:
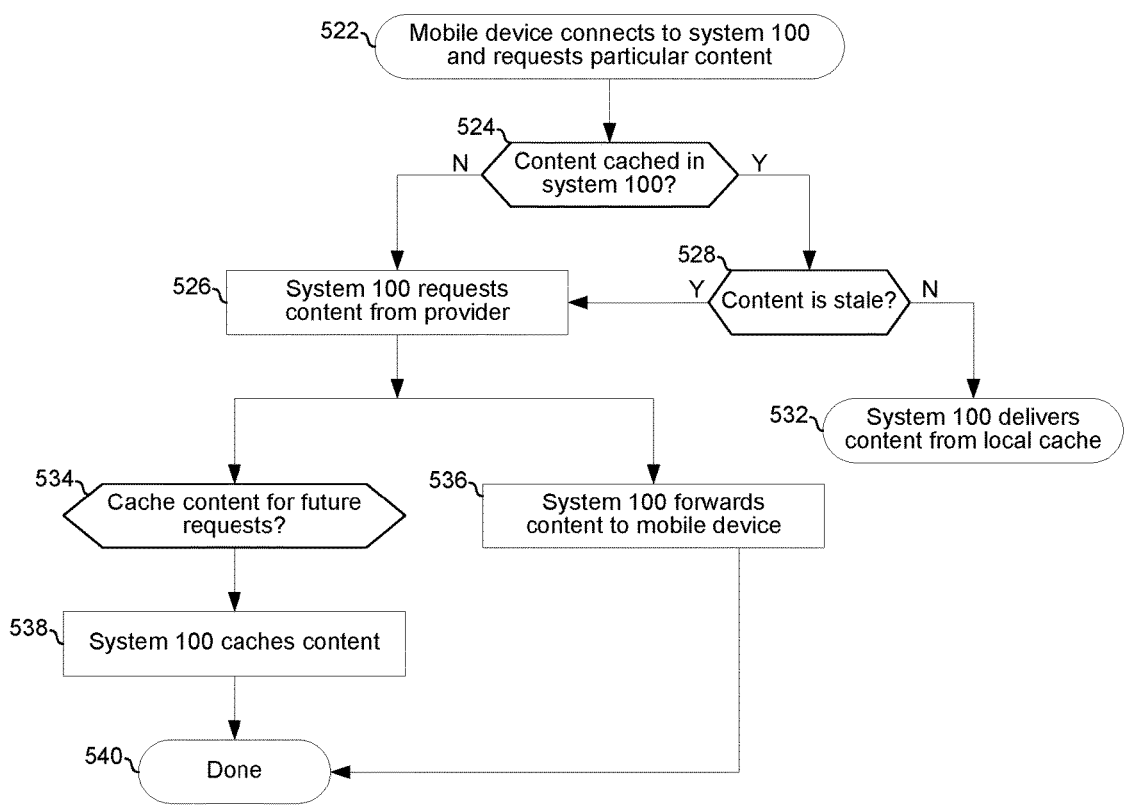

The example steps in FIG. 5C begin with step 522 in which the mobile device 100 connects to the system 100 and requests particular content (e.g., a particular movie, episode of a television show, whatever is currently playing on a particular television network, a particular webpage, etc.). In step 524, the system 100 determines whether the requested content is stored in its cache. In not, then the steps may proceed to step 526.

Returning to step 524, if the content is cached in the module 420, then in step 528, the system 100 determines whether the cached content is up-to-date or whether it is stale. The determination of whether the content is stale may be via a low-bandwidth and/or low-latency signaling between the system 100 and the content provider either via the module 108 or the module 106. If the content is not stale, then in step 532 the system 100 may transmit the cached content to the mobile device 110.

Returning to step 528, if the content is stale then, in step 526, the system 100 may receive the requested content. If the content is available via satellite, the module 104 may be configured to receive the requested content from the satellite 102 and output the content to the module 124. If the content is available via the WAN 120 (e.g., the Internet), the system 100 may send a request for the content out to the provider via the WAN 120 and receive the content via the module 108.

After step 526, the steps proceed to step 536 in which the content received via the module 104 and/or the module 108 is conveyed, by module 124, to the module 106 for transmission to the mobile device 110. After step 526, the steps conclude with step 540.

In parallel with step 526 are the steps 534 and 538. In step 534 the system 100 determines whether to cache the received content in the module 402. The determination may be, for example, based on the popularity of the content. For example, if the system 100 has received multiple requests for the particular content and/or past traffic patterns indicate the content will be requested again, the system 100 may store the content to module 402 to avoid having to receive the content again in the future. If the system 100 decides to cache the content, then the steps proceed to step 538 in which the content is stored to the module 402.

FIG. 6A illustrates caching of content based on provided route information and/or location prediction. In FIG. 6A, a satellite subscriber plans to travel from location 606 to 608 with in his/her vehicle 606 which comprises a navigation/entertainment system operable to receive content from instances of the system 100. That is, the navigation/entertainment system may be enabled to receive content broadcast on a connection 116, and/or content transmitted over a unicast or multicast connection 134 using any suitable wireless technology (e.g., cellular, Wi-Fi, WiMAX, WiGig, etc.). In another implementation, the subscriber may travel with a mobile device (e.g., a handset or tablet) operable to receive content from instances of the system 100. That is, the handset or tablet may be enabled to receive content broadcast on a connection 116, and/or content transmitted over a unicast or multicast connection 134 using any suitable wireless technology (e.g., cellular, Wi-Fi, WiMAX, WiGig, etc.).

Along the route 604 are six instances of the system 100. The system $100_1$ has a coverage area $602_1$, system $100_2$ has a coverage area $602_2$, system $100_3$ has a coverage area $602_3$, system $100_4$ has a coverage area $602_4$, system $100_5$ has a coverage area $602_5$, and system $100_6$ has a coverage area $602_6$. As the subscriber travels along route 604 from location 606 to location 608 (indicated by a heavy dashed line), he is in each of the coverage areas for some portion of the trip. Example details of how content is delivered to the subscriber as s/he travels from location 606 to location 608 are described below with reference to FIG. 6B.

Figure 6B:
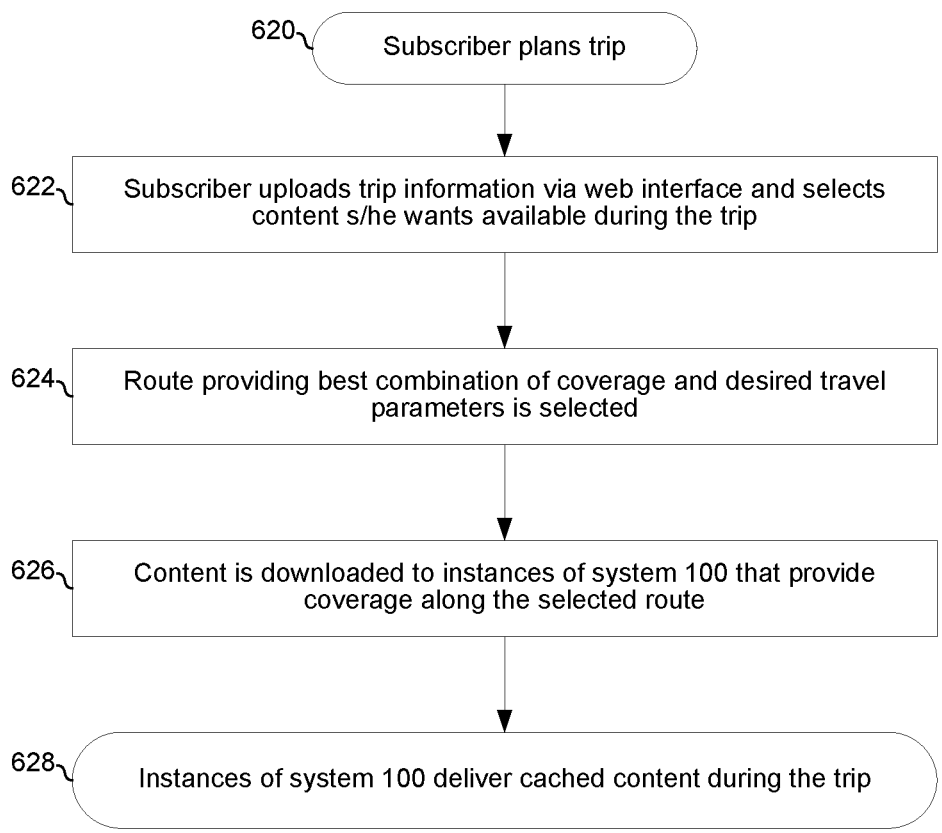
FIG. 6B describes an example scenario of content delivery using route-based and/or location predictive content caching.

FIG. 6B describes an example scenario of content delivery using route-based and/or location predictive content caching. The steps begin with step 620 in which the subscriber decides to take a trip from location 606 to location 608 at a particular time.

In step 622, the subscriber may upload the planned trip to a server which handles route-based caching and delivery of content. The trip may, for example, be uploaded via a vehicle navigation system and/or via a web interface accessed on a mobile device. The subscriber may also upload a list of content that s/he would like to consume during the trip.

In step 624, if the user has not manually selected a desired route from location 606 to location 608 trip, the server may calculate a route based on any one or more parameters such as traffic considerations, distance considerations, where instances of the system 100 are located (e.g., which route has the best coverage), subscription models associated with the instances of the system 100, resource availability in the instances of the system 100, etc. For purposes of illustration, it is assumed the route 604 is selected either manually by the subscriber or selected by the server based on input from the subscriber and/or other parameters. The route may be stored in the server for use in coordinating caching and delivery of content during the trip and may be downloaded to the user's navigation system, in the case of a vehicle, or a map application, in the case of a handset or tablet, for example.

In step 626, the server, utilizing the uploaded route information and list of desired content, may selectively cache content on the instances of the system 100 that provide coverage along the route 604. In an example implementation, only portions of content that are likely to be consumed while in a particular coverage area may be downloaded to the instance of system 100 associated with that coverage area. For example, if, based on the planned route, traffic, etc., the subscriber will be in coverage area $602_1$ from 12:00 until 12:15 and in coverage area $602_2$ from 12:15 until 12:30, then only the portion of the desired content that the subscriber will consume from 12:00 until 12:15 may be cached on the system $100_1$ and only the portion of the desired content that the subscriber will consume from 12:15 until 12:30 may be cached on the system $100_2$. In this manner, the amount of data cached on each system 100 may be reduced relative to having to cache all of the desired content on all instances of system 100 along the route 604. There may be some overlap in the cached data to account for unforeseen delays and/or to accommodate seamless handoff without the content being interrupted.

To further illustrate, consider an example scenario where the subscriber will be in each of the coverage areas $602_1$-$602_6$ for an equal amount of time and would like to watch a movie that is exactly as long as the trip. In such an idealized scenario, ⅙ of the movie may be cached on each of the systems $100_1$-$100_6$, with the first ⅙$^{th}$ being cached on system $100_1$, the second sixth being cached on system $100_2$, and so on.

In addition to (or alternatively to) caching on the systems 100 being planned based on the route information, bandwidth, frequency allocations, and/or other resources of the systems $100_1$-$100_6$ may be planned based on the route information. For example, a certain amount of bandwidth necessary for delivering the desired content may be reserved on each of the systems $100_1$-$100_6$ for the respective time period in which the subscriber will be in that system's coverage area. Additionally or alternatively, which channels are reserved for providing the reserved bandwidth may depend on the planned route (e.g., which of the systems $100_1$-$100_6$ will be handing off to which other of the systems $100_1$-$100_6$), local restrictions, spectrum licenses, other trips planned for other devices, and/or any other suitable parameter(s).

In step 628, the subscriber begins the trip. While in each coverage area $602_i$ (i being an integer between 1 and 6), the content cached on system $100_i$ is transmitted to the subscriber's device. During the trip, the subscriber's position and/or velocity (e.g., reported to the systems $100_1$-$100_6$ via a low-bandwidth connection) may reported by the subscriber's device and may be used for adjusting caching, reservation of resources, allocation of channels, etc. For example, as it is determined that a portion of the content will be viewed on system $100_i$ rather than via system $100_{i+1}$, the system $100_{i+1}$ may flush that portion of the content from memory to make room for other data. During the trip, the subscriber's position and velocity may also be used in preparing for hand-off's from system $100_i$ to system $100_{i+1}$ such that the subscriber receives the content as interruption free as possible. An illustrative scenario is described in the following paragraph.

At time T0, a first subscriber's device may be receiving content from system $100_i$ on channel 1. Using the first subscriber's pre-uploaded route and current position and velocity, it may be determined (e.g., by a particular one of systems $100_1$-$100_6$ and/or by a centralized management entity that manages/coordinates the systems $100_1$-$100_6$) that the first subscriber's device will be handed-off from system $100_i$ to $100_{i+1}$ at time T1. At time T1-Δ, the system $100_{i+1}$ receives a request for bandwidth from a second subscriber's device. If the second subscriber device needs the bandwidth for period of time less than Δ, channel 1 on the system $100_{i+1}$ may be allocated to the second subscriber's device. Conversely, if the second subscriber's device needs the bandwidth for a period of time longer than Δ, a channel other than channel 1 may be allocated to the second subscriber's device such that channel 1 on the system $100_{i+1}$ is available for handling the first subscriber's device beginning at time T1. In this manner, the first subscriber's device does not need to change channels upon being handed off to system $100_{i+1}$.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for caching content for mobile distribution.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A system comprising:
    a satellite reception assembly that comprises;
        a receive module comprising one or more circuits, wherein the receiver module is operable to:
            receive a satellite signal;
            process the satellite signal to recover data carried in the satellite signal;
            determine when the recovered data comprises a portion for local wireless broadcast by the system;
            determine the portion of recovered data based on information provided by a mobile device of a satellite subscriber, wherein:
                the information pertains to a trip that the subscriber is planning to take;
                the information pertains to data that the subscriber desires to receive from the satellite reception assembly during the trip; and
                the information comprises a current position and/or velocity of the mobile device of the satellite subscriber; and
            generate a broadcast signal for carrying the portion of recovered data, wherein:
                the broadcast signal is configured in accordance with a particular wireless protocol, and
                the portion of recovered data is processed for transmission via the broadcast signal; and
        a basestation module comprising one or more circuits, wherein the basestation module is operable to transmit broadcast signals generated in the satellite reception assembly.

2. The system of claim 1, wherein the satellite reception assembly comprises a transceiver module operable to communicate with a central server associated with one or more service providers.

3. The system of claim 2, wherein the transceiver module is operable to obtain from the central server data required to facilitate the generating and/or transmission of the broadcast signal.

4. The system of claim 2, wherein the transceiver module is operable to communicate to central server data required data required for authorizing a mobile device and/or a user associated with the mobile device.

5. The system of claim 1, wherein:
    the satellite reception assembly is connected to a gateway that routes traffic between the system and a wide area network connection terminated at the gateway; and
    in being conveyed from the receive module to the basestation module, the portion of recovered data does not traverse the wide area network connection.

6. The system of claim 1, wherein the receive module is operable to determine the portion of recovered data based on demand for particular data in a coverage area served by the basestation module.

7. The system of claim 1, wherein:
    the information pertains to the subscriber's location at one or more time intervals in the future; and
    the information pertains to data that the subscriber desired to receive during the one or more time intervals in the future.

8. The system of claim 1, wherein the portion of recovered data is web-based content transmitted intermittently by a satellite for the purpose of storing the web-based content in a memory of the system.

9. The system of claim 1, wherein the satellite reception assembly comprises a rigid support structure to which the receive module and the basestation module are mounted.

10. A method comprising:
    in satellite reception assembly that comprises a basestation module:
        receiving a satellite signal;
        processing the satellite signal to recover data carried in the satellite signal;

determining when the recovered data comprises a portion for local wireless broadcast by the system;

determining the portion of recovered data based on information provided by a mobile device of a satellite subscriber, wherein:

the information pertains to the subscriber's location at one or more time intervals in the future; and the information pertains to data that the subscriber desired to receive during the one or more time intervals in the future; and generating a broadcast signal for carrying the portion of recovered data, wherein:

the broadcast signal is configured in accordance with a particular wireless protocol, and the generating comprises processing the portion of recovered data for transmission via the broadcast signal; and transmitting the broadcast signal via the basestation module.

11. The method of claim 10, comprising obtaining from a central server associated with one or more service providers, data required to facilitate the generating and/or transmission of the broadcast signal.

12. The method of claim 10, comprising authorizing, using a central server associated with one or more service providers, a mobile device or a user associated with the mobile device.

13. The method of claim 10, comprising determining the portion of recovered data based on demand for particular data in a coverage area served by the basestation module.

14. The method of claim 10, wherein:

the information pertains to a trip that the subscriber is planning to take; and the information pertains to data that the subscriber desires to receive from the satellite reception assembly during the trip.

15. The method of claim 14, wherein the information comprises a current position and/or velocity of the mobile device of the satellite subscriber.

16. The method of claim 10, wherein the satellite signal is a satellite spot beam temporarily allocated to transmission of the portion of recovered data.

17. The method of claim 10, comprising allocating resources of the satellite reception assembly to the mobile device of the satellite subscriber based on the information pertaining to the trip that the subscriber is planning to take and based on the current position and/or velocity of the mobile device of the satellite subscriber.

\* \* \* \* \*